Sept. 22, 1970

W. C. LEASURE 3,529,397

METHOD AND APPARATUS FOR FORMING
TETRAHEDRON-SHAPED PACKAGES

Filed Dec. 19, 1967

INVENTOR
WILLIAM C. LEASURE

BY *Larson and Taylor*

ATTORNEYS

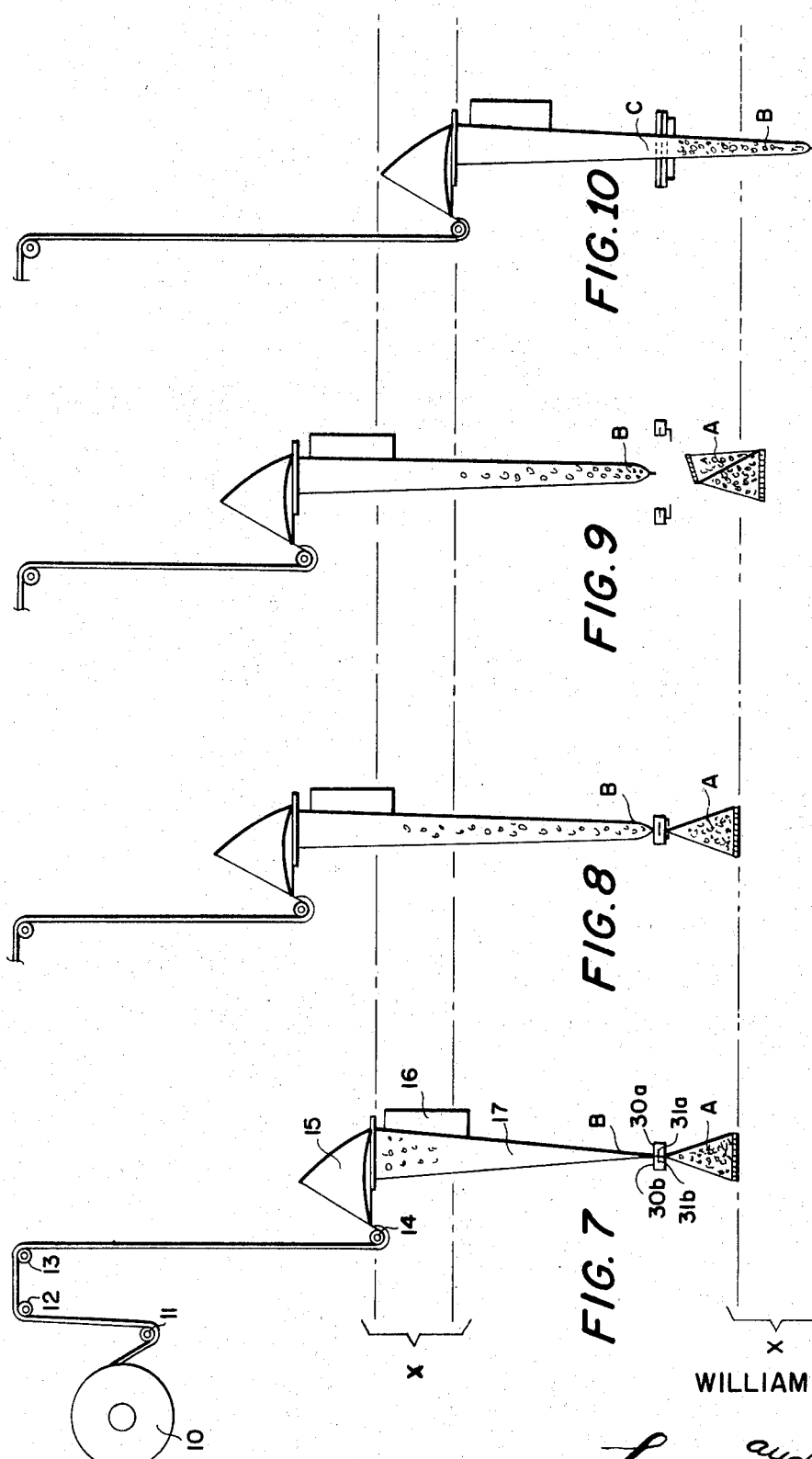

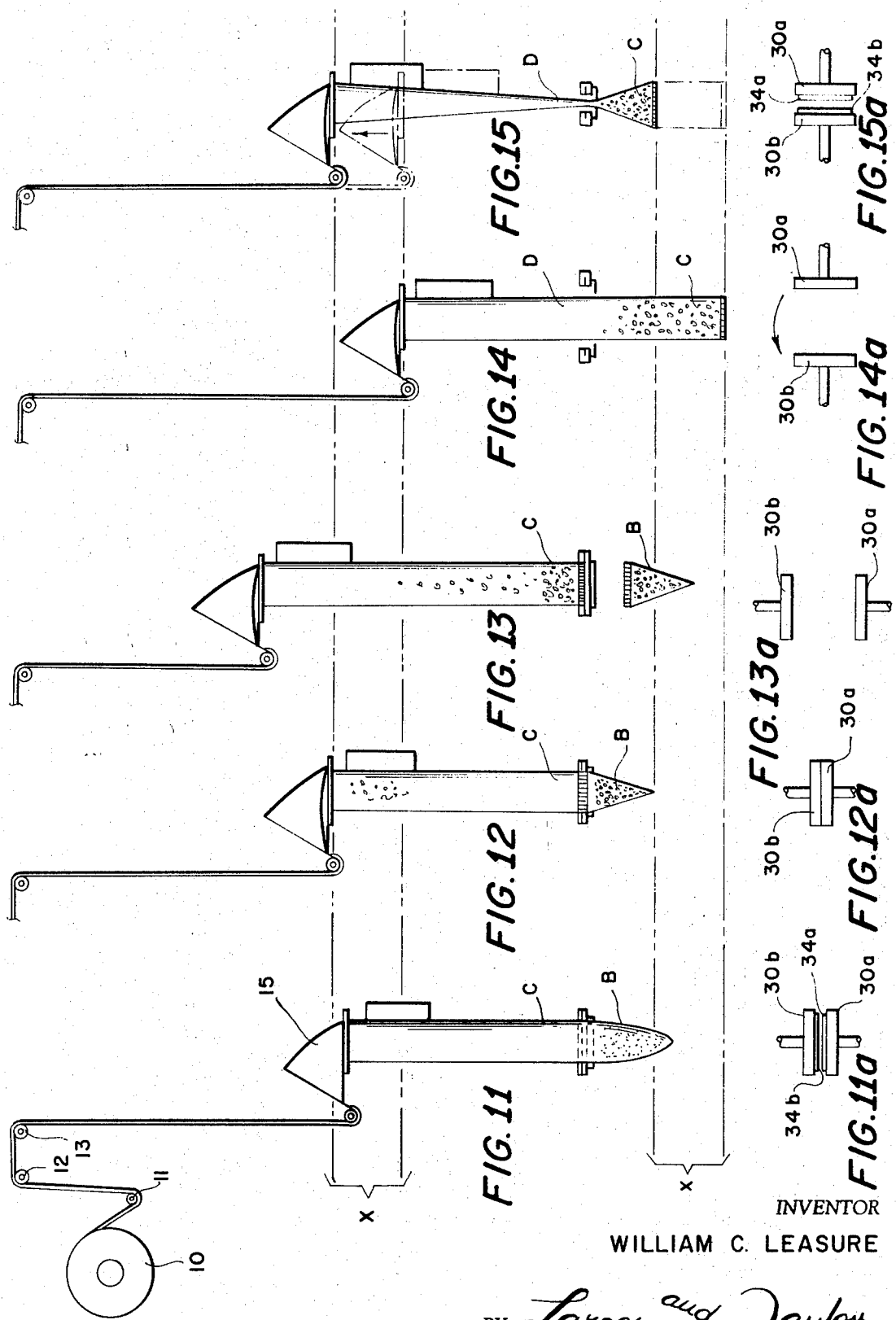

United States Patent Office 3,529,397
Patented Sept. 22, 1970

3,529,397
METHOD AND APPARATUS FOR FORMING
TETRAHEDRON-SHAPED PACKAGES
William C. Leasure, Houston, Tex., assignor to
Mira-Pak, Inc., Houston, Tex.
Filed Dec. 19, 1967, Ser. No. 691,753
Int. Cl. B65b 9/00
U.S. Cl. 53—28        5 Claims

ABSTRACT OF THE DISCLOSURE

A procedure for producing tetrahedron-shaped packages from a continuous length of flexible tubular material formed by a former from a continuous strip of flexible sheet material. Seals across the length of material are formed by clamping jaws movable only in planes transverse to the direction of movement of the tubular material and the tubular material is advanced by moving the former. One arrangement includes two sets of mutually perpendicular clamping jaws located in different planes and another arrangement includes a single pair of clamping jaws rotatable in its transverse plane about the tube axis to form two mutually perpendicular seals.

BACKGROUND—FIELD OF THE INVENTION

This invention relates to packaging, and in particular it relates to a method and apparatus for the production of tetrahedron-shaped packages.

BACKGROUND—ENVIRONMENT OF THE INVENTION

In my previous Pat. No. 2,969,627, issued Jan. 31, 1961, I disclosed and claimed a method and apparatus for forming a plurality of conventional pillow-type packages from a continuous length of tubular material which length has been formed by a former from a continuous length of flexible strip material. The method and apparatus of that patent involves advancing the length of tubular material by moving the former while holding the length of tubular material stationary with clamping jaws.

As explained in my said earlier patent, this method of operation provides certain advantages over earlier "stationary former" procedures. For example, in connection with packaging lightweight products such as potato chips, the product is not always entirely within the package at the time the upper seal is to be formed. This is due to the fact that when the product is released at the upper end of the former for entry into the package, the gripping and sealing means is pulling the package away from the product so that the product must move rapidly in order to reach the bottom of the package before the sealing jaws release the package and move upwardly and into sealing engagement to form the top seal. Chips are normally irregular in shape and are lightweight and consequently do not pass through this distance in as short a length of time as a heavier object would. Consequently, the potato chips are not always all in the bag when the machine is cycling at the normal economic rate. Furthermore, because of fragile characteristics certain products may become broken or damaged in passing through the distance from the supply hopper to the bag.

Difficulties have also been encountered in connection with packaging liquids or heavier products such as, for example, articles of produce. When the liquid or the heavier articles enter the package the jaws have formed the bottom seal, have disengaged the package and are moving upwardly. The seal at the bottom is not normally sufficiently cooled at this time and the liquid or the weight of the heavier product entering the package may tend to open this bottom seal. Further, the length of product drop may damage certain products. Thus, the movable former method of operation solves these previous problems by providing an apparatus wherein the sealing jaws are mounted for reciprocating movement into and out of engagement with the packaging material but prevented from moving vertically within the frame. The former, however, is mounted for vertical reciprocating movement on the frame.

The apparatus shown in my earlier patent for vertical reciprocating movement of the former in the frame may also be employed in the procedure of the present invention for providing vertical reciprocating movement of the former in the frame.

In another of my previous patents, No. 3,027,695, issued April 3, 1962, there is shown an arrangement including stripper plates which may be mounted on the reciprocating clamping jaws for flattening the length of tubular material immediately before engagement thereof by the clamping jaws. This arrangement may also be employed together with one of the embodiments of the present invention.

BACKGROUND—DESCRIPTION OF THE PRIOR ART

It is known to produce tetrahedron packages from a continuous length of tubular packaging material. However, the method and the apparatus employed heretofore have employed the conventional "stationary former" methods and apparatus.

SUMMARY OF THE INVENTION

Thus, a main purpose of the present invention is the adaptation of the stationary clamping jaws—movable former arrangement to the production of tetrahedron-shaped packages.

According to the present invention there is provided first an arrangement for providing vertical reciprocatory movement of the former. This can be carried out by the apparatus shown in FIGS. 11 and 12 of my said earlier Pat. No. 2,969,627.

In addition, the present invention includes means movable in a horizontal plane or horizontal planes transverse to the direction of movement of the former for producing alternate mutually perpendicular seals across the length of material. That is, each seal is parallel to the second preceding and second following seal across the length of tubular material and perpendicular to each adjacent seal. This provides the continuous flow of tetrahedron-shaped packages.

One arrangement of the invention includes two sets of sealing jaws, each set being mounted for reciprocating movement towards and away from the length of tubular material in mutually perpendicular directions and in different horizontal planes.

A method of operation employing this arrangement includes holding the length of material with the sealing jaws, moving the former upwardly to provide above the top set of sealing jaws a length of tubular material equal to twice the distance between the two said horizontal planes, and then lowering the length of tubular material until the upper end of said length is in the horizontal plane of the upper set of jaws. This method of operation includes, of course, feeding the product and severing the finished bags at suitable times during the packaging process.

Another arrangement of the present invention includes a single set of opposed sealing jaws mounted on a frame for rotating movement about the axis of the tubular length of material.

The method of operation with this last said means includes grasping the tubular length of material and moving the former upwardly to form a length of material above the plane of the clamping jaws at least as great as the length of material which will comprise the finished package, filling the package and then lowering the tubular length of material so that the given length of material, filled with a batch of product, is below the horizontal plane of the clamping jaws, and then closing the package by forming an upper seal perpendicular to the bottom seal of that package to form the finished package.

This latter arrangement may also include means for stripping the package in accordance with my previous Pat. No. 3,027,695.

Thus, it is an object of this invention to provide an improved method and apparatus for the production of tetrahedron-shaped packages.

It is another object of this invention to provide a method and apparatus for forming a tetrahedron-shaped package wherein advancement of the length of tubular material is carried out by moving the former, while suitable clamping jaws engage the length of material.

It is still another object of this invention to provide a method and apparatus for forming tetrahedron-shaped packages including a single set of clamping jaws movable in a single horizontal plane and rotatable about an axis for forming two mutually perpendicular seals in combination with a movable former.

It is still another object of this invention to provide a method and apparatus including two sets of clamping jaws movable in different planes and in mutually perpendicular directions for forming mutually perpendicular seals in combination with a movable former.

Other objects and the attendant advantages of the present invention will become apparent from the detailed description to follow together with the accompanying drawings.

BRIEF DESCRIPTION OF THE DRAWINGS

It is to be understood that the following detailed description of preferred embodiments of the invention and the accompanying drawings are illustrative and that the invention is capable of numerous modifications and variations apparent to those skilled in the art.

In the drawings:

FIGS. 7-15, inclusive, are diagrammatic elevation views showing the sequence of operation of a second arrangement of the invention.

FIGS. 7a-15a, inclusive, are diagrammatic plan views of the clamping jaws in FIGS. 7-15, respectively.

DETAILED DESCRIPTION OF THE PREFERRED EMBODIMENTS

Figure 1:
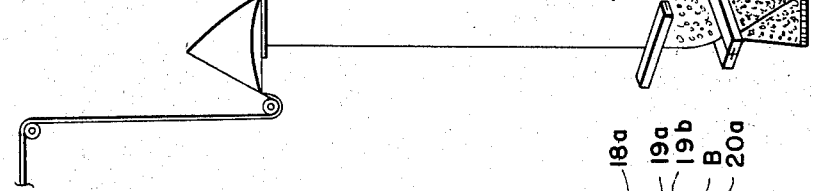

Referring now to the drawings, wherein like numerals indicate like parts throughout the several views and wherein the subscripts $a$, and $b$ represent similar but opposing parts, there is shown in FIG. 1 a roll of packaging material 10 which is of the type which may be sealed and which is drawn off the roll and is passed over a series of rollers 11, 12 and 13 having stationary axes and then over a roller 14 which is movable vertically in a frame. The material then passes over a former 15 which may be similar to the type of former shown in FIGS. 13 and 14 of my previous Pat. No. 2,969,627, this former being connected to a base 16. The elements 14 15, and 16 are all connected together for vertical reciprocating movement in a frame. The length of packaging material is now formed into a continuous tube 17.

The arrangement further includes an upper set of sealing or clamping jaws 18a and 18b mounted for reciprocatory movement towards and away from the axis of the tube 17 but unable to partake in vertical movement parallel to the axis of the tube. These clamping jaws include slots 19a and 19b, one of which slots would contain a cutting element, and the other a recess for receiving the cutting element for the purpose of severing a finished package from the remainder of the tube 17 after the completion thereof.

A second set of clamping jaws 20a and 20b with recesses 21a and 21b is identical to the first set of clamping jaws except that the latter set is located in a horizontal plane spaced below the horizontal plane of the first set by a distance equal to the intended height of the package to be formed. Further, the jaws 20a and 20b are mounted for movement in a direction perpendicular to the direction of movement of jaws 18a and 18b.

Figure 3:
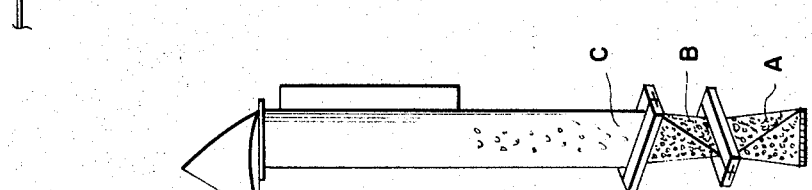
Figure 2:
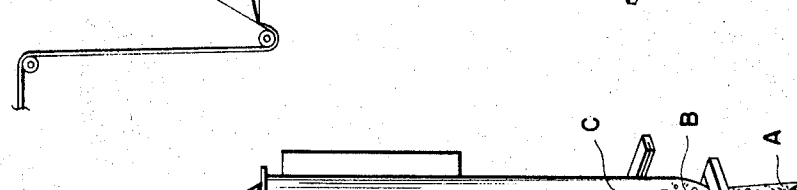

The cycle of operation with the arrangement of FIGS. 1-6 is as follows. FIG. 1 shows a filled package A with the lower jaws 20a and 20b in the engaged position to both seal the top of package A and to form the bottom seal of a length of material B which will comprise the next package. As the material is being held by the jaws 20a and 20b a batch of product is being fed downwardly through the tube between open jaws 18a and 18b to the package B. Referring to FIG. 2 it is noted that even after the product has completed its movement to package B, the jaws 20a and 20b have still remained in place. In FIG. 3 the upper jaws 18a and 18b have closed to form a seal between packages B and the length of material to form package C. Product is then fed above closed jaws 18a and 18b to the length of material to form package C.

Figure 4:
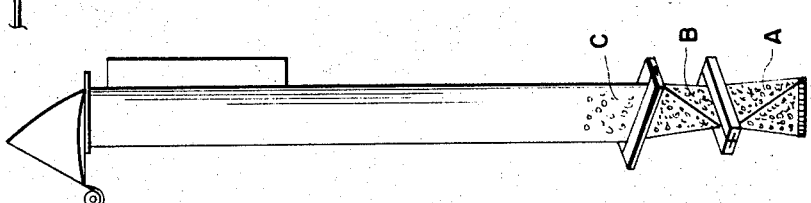

Referring to FIG. 4, either during or after the step of filling package C, but with at least one of the clamping jaws securely engaged against the length of tubular material, the former is raised to place between the former and the upper clamping jaws sufficient tubular material to form two additional packages (that is, equal to twice the distance between the planes of the two sets of clamping jaws).

Figure 6:
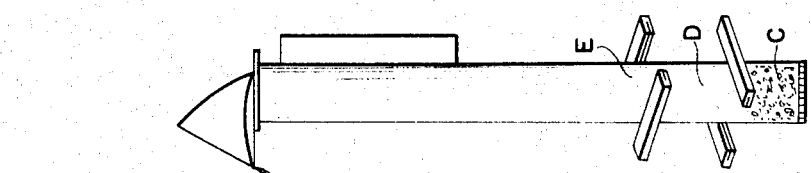
FIGS. 1-6, inclusive, are perspective diagrammatic drawings showing the sequence of operation of a first arrangement of the invention.
Figure 5:
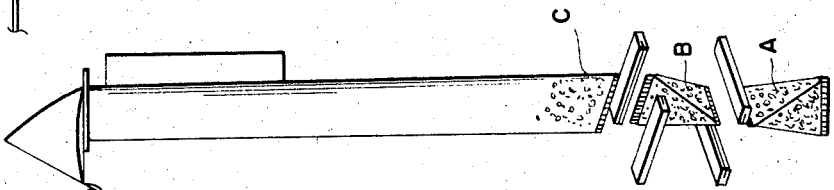

The cutting elements are then operated to sever packages A and B and the two sets of clamping jaws are separated thereby permitting package B to fall together with package A from the apparatus. Referring now to FIG. 6, the former is then lowered a distance equal to twice the distance between the two sets of clamping jaws so that package C occupies the position occupied by package A in FIG. 1 with lengths of material D and E above it. The lower clamping jaws 20a and 20b then engage the tubular material thereby reaching the position shown in FIG. 1 after which the cycle is repeated. With the structure illustrated in FIGS. 1-6 variations of the operating method are immediately apparent and these are intended to form a part of the present invention. For example, the former may be raised immediately after engagement of the clamping jaws 20a and 20b as shown in FIG. 1 rather than after the sealing jaws 18a and 18b engaged the material. However, the first said arrangement is preferable since, during former movement, the material is being held in place by two sets rather than one set of clamping jaws. Further, the package A could be severed and clamping jaws 20a and 20b released immediately after the step shown in FIG. 2. However, for at least two reasons it is preferable to keep the jaws 20a and 20b in place. First, as noted above, this provides a double holding of the tubular material during the time that the former is being raised. Secondly, the operation is somewhat simplified if the cutting means are operated, and the jaws are separated simultaneously.

Referring now to FIGS. 7-15 and 7a-15a there is shown a second arrangement for carrying out the present invention. Elements 10-17 in these figures are identical with the elements of the same numbers in the arrangement of FIGS. 1-6. However, in FIG. 7 there is only one set of jaws, 30a and 30b, these jaws per se being similar to the jaws 18a and 18b or 21a and 21b. The jaws also include slots 31a and 31b for a cutting element and a corresponding recess similar to elements 19a and 19b or 21a and 21b. As shown in FIG. 7 the elements 30a and 30b are mounted for reciprocating movement towards and away from each other on rods 32a and 32b in turn being mounted on a frame 33 which is rotatable about a vertical axis passing through its center. Therefore, the jaws 30a and 30b are movable, in their horizontal plane, both towards and away from each other and about the axis of tube 17.

The arrangement of FIGS. 7–15 may also include stripper plates of the kind shown in my previous Pat. No. 3,027,695. For a specific disclosure of these plates reference is made to that said patent. Otherwise, the plates have been omitted for purposes of clarity except in FIGS. 11, 11a, 15 and 15a where the stripper plates are employed to engage the package.

The operation of this second arrangement of the invention includes the steps of employing the stripper plates. However, it should be apparent that the procedure for forming tetrahedron-shaped packages with this arrangement can be carried out, and in fact is actually simplified, by omitting stripper plates and the stripping function.

The arrangement of FIGS. 7–15 operates as follows. FIG. 7 shows the operation just after a package A has been filled and the upper seal formed thereacross by jaws 30 and 30a. It would be possible to sever the package A from the tube 17 at this time. However, to provide a better grip on the tube as the former moves upwardly to expose an additional length of tubular material, the jaws 30 and 30a are held in place as the former is raised to expose a length of tubular material at least as great as the vertical length of the package A.

In FIG. 7, product has started to fall into package B. Product continues to enter the package B as the former moves up to the position of FIG. 8, while jaws 30a and 30b hold the tube 17, to form tubular material for package C. FIGS. 9 and 9a then show the severing of the package A from the remainder of the tube 17 and separation of the jaws 30a and 30b. FIGS. 10 and 10a then show the movement of the jaws 90° to the position at which the jaws can form a seal perpendicular to the seal formed in FIG. 7. As the jaws are thus turned 90°, the former is lowered so that the length of material B immediately above the package A is below the level of the jaws. Actually, instead of moving the former down to the level of FIG. 10, it could stop at the level shown in FIGS. 11 and 12 at which level the top seal of package B would be formed. However, as illustrated, FIGS. 10, 10a, and 11 and 11a illustrate the stripper operation. In FIG. 10 the tube 17 is lowered so that the level of the top seal of package B is actually below the jaws. Stripper plates 34a and 34b (see FIGS. 11 and 11a, 15 and 15a) then move inwardly to engage and flatten the tube during which time the former moves upwardly so that the portion of the tube at which the seal is to be formed moves through the stripper plates and is thereby cleared of any extraneous product. The as shown in FIGS. 12 and 12a the top seal of package B is formed and product starts to fill package C. The former then moves upwardly in FIGS. 13 and 13a to expose the additional length of tubular material for package D while product continues to enter package C. Package B is then severed by cutting means 31a and 31b after which the sealing jaws 30a and 30b separate from each other and turn 90°, as shown in FIGS. 14 and 14a, and the jaw is lowered to the level of FIG. 14 which is equivalent to the level of FIG. 10. The former then moves upwardly as the stripper plates 34a and 34b strip and flatten the tube immediately above the package C. The tube then reaches the position exactly as shown in FIG. 7. The seal at the top of figure C is then formed and the procedure of FIGS. 7–15 is repeated.

It will be noted that the procedure from FIG. 7 to FIG. 11 is virtually identical to the procedure from FIG. 12 to FIG. 15 except that in the latter group of figures the sealing jaws are turned 90° relative to the corresponding stages in the procedure from FIGS. 7–11.

It will be evident that the arrangement shown in FIGS. 7–15 is subject to many modifications. For example, the finished package could be severed before the former reaches its uppermost position. The stripping operation could be eliminated. The frame 33 could continue moving in the same direction or it could turn first 90° in one direction and then reverse itself, etc.

Although the invention has been described in considerable detail with respect to preferred embodiments thereof, it should be understood that the invention is capable of numerous other modifications and variations apparent to those skilled in the art without departing from the spirit and scope of the invention as defined in the claims.

I claim:

1. A method of packaging wherein packaging material is passed over a former to form the same into a tube of material, comprising the steps of moving the tube to a position whereat first and second packages are to be closed off, forming a first seal across the tube to close off the first package by moving a pair of sealing jaws horizontally against the tube, introducing product into the tube above the first seal, forming a second seal across the tube above the said product to close off a second package containing said product by moving a second pair of sealing jaws horizontally against the tube such that the second seal is disposed at an angle relative to the first seal, introducing further product into the tube above the second seal, forming an additional length of tube material greater in length than the vertical distance between the two pairs of sealing jaws by moving the former upwardly concurrently with the formation of at least one of said seals, separating the sealing jaws of both pairs and then subsequently moving the tube down between the opened sealing jaws a distance greater than the said vertical distance between the two pairs of sealing jaws until the tube reaches the position which it will occupy during the closing off to two further packages, the first of which further packages is the package filled with said further product, said downward movement of the tube being accomplished by moving the said former down such that the former carries the tube of material down with it relative to the sealing jaws.

2. The method of claim 1, each pair of sealing jaws being movable only in a plane substantially transverse to the axis of the length of tube, wherein the said step of moving the seals comprises moving the first pair of sealing jaws towards each other in one transverse plane to form the first seal and moving the second pair of sealing jaws towards each other in another transverse plane to form the second seal.

3. The method of claim 1 wherein the step of forming the additional length of material comprises moving the former upwardly a distance substantially equal to twice the vertical distance between the two pairs of sealing jaws.

4. The method of claim 1 including the step of severing the said first package to be closed from the remainder of said tube after the said first seal has been formed.

5. The method of claim 1 wherein the step of moving the tube downwardly comprises moving the tub down a distance equal to substantially twice the vertical distance between the two said pairs of sealing jaws.

References Cited

UNITED STATES PATENTS

| | | | |
|---|---|---|---|
| 1,937,501 | 12/1933 | Aldrich | 53—182 X |
| 2,969,627 | 1/1961 | Leasure | 53—28 |
| 3,026,658 | 3/1962 | Schneider et al. | 53—28 |
| 3,027,695 | 4/1962 | Leasure | 53—182 X |
| 3,086,335 | 4/1963 | Frank | 53—180 |
| 3,221,469 | 12/1965 | Murray | 53—28 |
| 3,320,719 | 5/1967 | Murray | 53—182 |

TRAVIS S. McGEHEE, Primary Examiner

E. F. DESMOND, Assistant Examiner